United States Patent
Yavuz et al.

(10) Patent No.: US 9,661,545 B2
(45) Date of Patent: May 23, 2017

(54) METHOD AND APPARATUS FOR HANDOVER OF DEVICE TO MITIGATE UPLINK INTERFERENCE IN FEMTOCELL DEPLOYMENTS

(75) Inventors: Mehmet Yavuz, San Diego, CA (US); Farhad Meshkati, San Diego, CA (US); Sumeeth Nagaraja, San Diego, CA (US); Yan Zhou, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 13/190,282

(22) Filed: Jul. 25, 2011

(65) Prior Publication Data

US 2012/0021788 A1  Jan. 26, 2012

Related U.S. Application Data

(60) Provisional application No. 61/367,782, filed on Jul. 26, 2010.

(51) Int. Cl.
*H04W 36/00* (2009.01)
*H04W 36/30* (2009.01)
(Continued)

(52) U.S. Cl.
CPC ............ *H04W 36/30* (2013.01); *H04B 17/24* (2015.01); *H04B 17/318* (2015.01);
(Continued)

(58) Field of Classification Search
CPC . H04W 36/00; H04W 36/0083; H04W 36/08; H04W 36/30; H04W 36/20;
(Continued)

(56) References Cited

U.S. PATENT DOCUMENTS 7,483,709 B2 * 1/2009 Kondo .......................... 455/522
7,778,657 B2 * 8/2010 Lin et al. ...................... 455/522
(Continued)

FOREIGN PATENT DOCUMENTS

CN    101267675 A    9/2008
CN    101695185 A    4/2010
(Continued)

OTHER PUBLICATIONS

International Search Report and Written Opinion—PCT/US2011/045426, ISA/EPO—Oct. 14, 2011.
Taiwan Search Report—TW100126424—TIPO—Oct. 22, 2013.

*Primary Examiner* — Huy C Ho

(57) ABSTRACT

Methods and apparatuses are provided for determining whether to handover a device to mitigate uplink interference while achieving acceptable uplink service quality in a wireless network. One or more parameters related to a device can be evaluated to determine whether to handover the device, such as a number of transmission power reports received from the device over a period of time, a frame error rate, setpoint, or power control commands related to the uplink of the device, a received pilot signal strength at the device, an uplink throughput or buffer size at the device, etc., from which transmit power information of the device can be inferred for determining whether the device potentially interferes with access points or devices. Based on the one or more parameters, an access point can determine whether handing over the device may mitigate such uplink interference while ensuring uplink service quality, and accordingly handover the device.

37 Claims, 13 Drawing Sheets

(51) Int. Cl.
*H04B 17/24* (2015.01)
*H04B 17/318* (2015.01)
*H04B 17/382* (2015.01)
*H04W 36/20* (2009.01)
*H04W 48/08* (2009.01)
*H04W 80/08* (2009.01)
*H04W 84/04* (2009.01)
*H04W 84/10* (2009.01)

(52) U.S. Cl.
CPC ........... *H04B 17/382* (2015.01); *H04W 36/20* (2013.01); *H04W 48/08* (2013.01); *H04W 80/08* (2013.01); *H04W 84/045* (2013.01); *H04W 84/105* (2013.01)

(58) Field of Classification Search
CPC ... H04W 48/08; H04W 80/08; H04W 84/045; H04B 17/24; H04B 17/318; H04B 17/382
USPC ........................................................ 455/436
See application file for complete search history.

(56) References Cited

U.S. PATENT DOCUMENTS

| | | | |
|---|---|---|---|
| 8,180,368 B2* | 5/2012 | Anderson | H04W 64/003 455/404.2 |
| 2009/0023448 A1* | 1/2009 | Attar et al. | 455/436 |
| 2009/0082026 A1 | 3/2009 | Yavuz et al. | |

FOREIGN PATENT DOCUMENTS

| | | |
|---|---|---|
| JP | 2002247630 A | 8/2002 |
| JP | 2005509327 A | 4/2005 |
| JP | 2008211645 A | 9/2008 |
| JP | 2010529732 A | 8/2010 |
| WO | WO-02100125 A1 | 12/2002 |
| WO | WO-2008147268 A1 | 12/2008 |
| WO | WO-2009039439 | 3/2009 |
| WO | 2010013055 A1 | 2/2010 |
| WO | 2010036188 A1 | 4/2010 |

* cited by examiner

METHOD AND APPARATUS FOR HANDOVER OF DEVICE TO MITIGATE UPLINK INTERFERENCE IN FEMTOCELL DEPLOYMENTS

CLAIM OF PRIORITY UNDER 35 U.S.C. §119

The present Application for Patent claims priority to Provisional Application No. 61/367,782 entitled "METHOD AND APPARATUS TO PROTECT FEMTO USER UPLINK PERFORMANCE VIA HAND-OVER TO MACRO" filed Jul. 26, 2010, and assigned to the assignee hereof and hereby expressly incorporated by reference herein.

BACKGROUND

Field

The following description relates generally to wireless network communications, and more particularly to managing interference.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

To supplement conventional access points, additional restricted access points can be deployed to provide more robust wireless coverage to mobile devices. For example, wireless relay stations and low power access points (e.g., which can be commonly referred to as Home NodeBs or Home eNBs, collectively referred to as H(e)NBs, femto access points, femtocells, picocells, microcells, etc.) can be deployed for incremental capacity growth, richer user experience, in-building or other specific geographic coverage, and/or the like. In some configurations, such low power access points can be connected to the Internet via broadband connection (e.g., digital subscriber line (DSL) router, cable or other modem, etc.), which can provide the backhaul link to the mobile operator's network. Thus, for example, the low power access points can be deployed in user homes to provide mobile network access to one or more devices via the broadband connection.

In this regard, deployment of such low power access points is unplanned in many cases, and thus the access points and/or mobile devices communicating therewith can cause interference to other low power access points, macrocell access points, or other devices in the vicinity. In one example, some low power access points can operate in a restricted association allowing communications only from certain devices. In this example, devices in-range but not allowed to communicate with the low power access point can interfere therewith when communicating to a different access point. In this regard, for example, devices communicating with the low power access point can increase transmit power to combat such interference. Thus, in one example, transmit power of mobile devices communicating with the low power access point can be capped to mitigate interfering with other mobile devices and/or access points by virtue of increasing transmit power. Capping transmit power, however, can degrade uplink performance of the mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with handing over a device communicating with a low power access point to another access point to improve uplink communications thereof. For example, the low power access point can obtain one or more parameters related to communicating with the device, and can determine to handover the device based at least in part on the one or more parameters. In an example, the one or more parameters can correspond to a transmit power of the device and/or receiving transmission power reports from the device, a frame error rate (FER), setpoint, power control commands related to uplink communications of the device, uplink throughput buffer size, downlink pilot Ec/Io at the device, uplink loading or noise rise at the other access point, and/or the like. In this regard, the device can be handed over based at least in part on the one or more parameters to mitigate interference to other devices or access points.

According to an example, a method for mitigating interference in a wireless network is provided. The method includes receiving one or more parameters related to a transmit power of a device and comparing the one or more parameters to a threshold value. The method also includes performing handover of the device to an access point based at least in part on the comparing.

In another aspect, an apparatus for mitigating interference in a wireless network is provided. The apparatus includes at least one processor configured to receive one or more parameters related to a transmit power of a device and compare the one or more parameters to a threshold value. The at least one processor is further configured to perform handover of the device to an access point based at least in part on the comparing. The apparatus also includes a memory coupled to the at least one processor.

In yet another aspect, an apparatus for mitigating interference in a wireless network is provided that includes means for receiving one or more parameters related to a transmit power of a device and means for comparing the one or more parameters to a threshold value. The apparatus further includes means for performing handover of the device to an access point based at least in part on the comparing.

Still, in another aspect, a computer-program product for mitigating interference in a wireless network is provided including a computer-readable medium having code for causing at least one computer to receive one or more parameters related to a transmit power of a device and code for causing the at least one computer to compare the one or more parameters to a threshold value. The computer-readable medium further includes code for causing the at least one computer to perform handover of the device to an access point based at least in part on the comparing.

Moreover, in an aspect, an apparatus for mitigating interference in a wireless network is provided that includes a communication parameter component for receiving one or more parameters related to a transmit power of a device and a handover determining component for comparing the one or more parameters to a threshold value. The apparatus further includes a handover component for performing handover of the device to an access point based at least in part on the comparing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
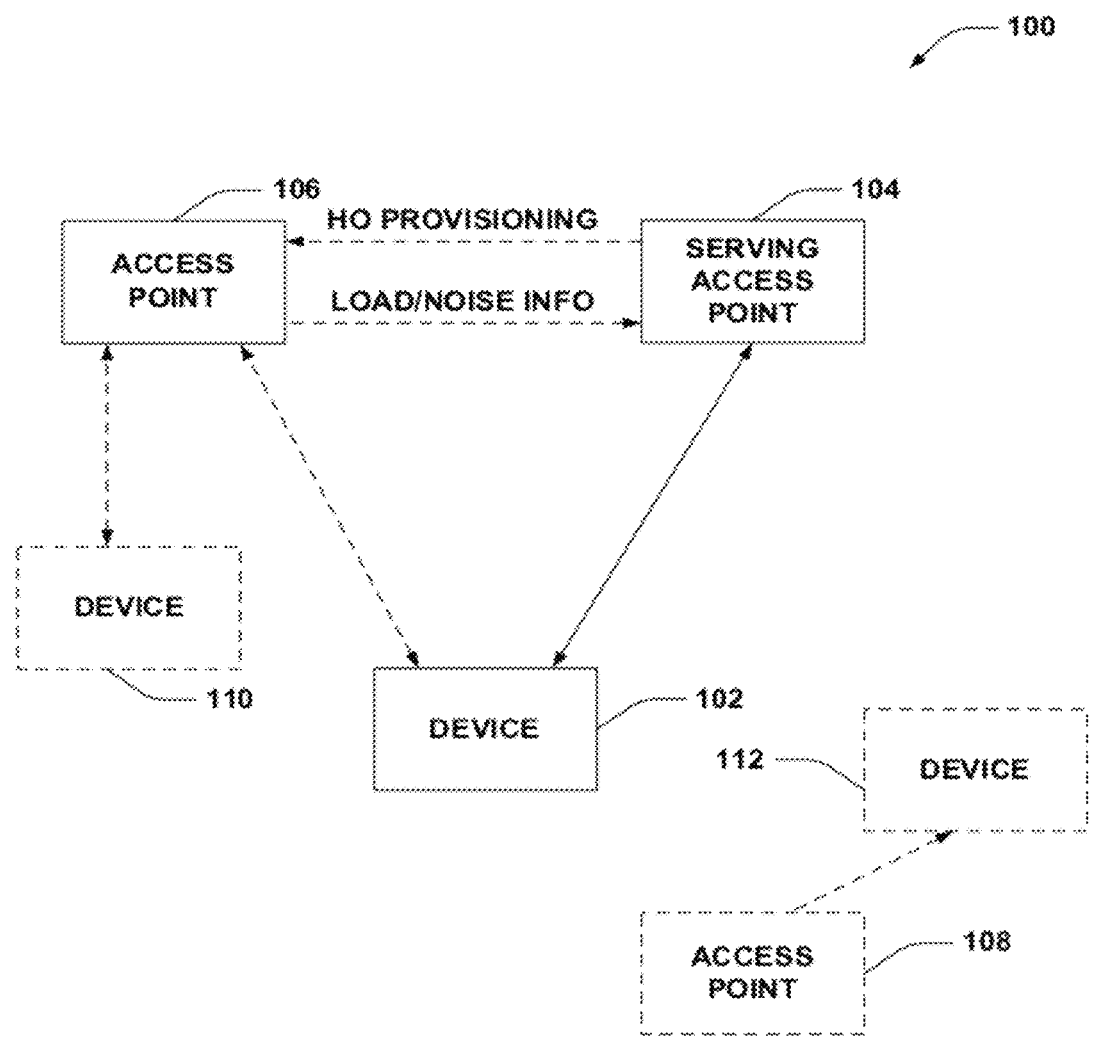
FIG. 1 is a block diagram of an example system for mitigating interference in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, various aspects are presented relating to handing over a device from a low power access point to another access point to prevent excessive interference to one or more access points or devices communicating therewith caused by the device increasing transmit power. In particular, the device can increase transmit power when communicating with the low power access point to mitigate interference from macrocell access points (or other access points) and/or devices communicating therewith, but such increasing power can cause interference as well. Thus, in one example, the low power access point can handover the device to another access point based at least in part on one or more parameters related to uplink communications to mitigate the potentially caused interference.

For example, the one or more parameters can comprise whether a device attains and/or consistently attains a transmit power at or within a threshold difference of a transmission power cap, a frame error rate (FER), setpoint, power control commands, etc. of the device, an uplink throughput buffer size, a downlink pilot strength, an uplink loading or noise rise related to the other access point, and/or the like. These parameters and/or similar parameters can indicate a level of caused uplink interference as well as uplink service quality of a device communicating with a low power base station, and can thus be used to determine whether to handover the device to another base station (e.g., within the same or different frequency and/or related to the same or different radio access technology (RAT)) to mitigate uplink interference while ensuring uplink service quality.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates handing over a device to mitigate interference. System 100 comprises a device 102 that can communicate with a serving access point 104 to receive access to a wireless network and/or one or more components thereof. System 100 can also comprise other access points 106 and/or 108 with which device 102 can potentially interfere. System 100 also optionally comprises other devices 110 and 112, communicating with access points 106 and 108, with which device 102 can additionally interfere when communicating with serving access point 104. For example, devices 102, 110, and/or 112 can each be a UE, modem (or other tethered device), a portion thereof, and/or the like. Access points 104, 106, and/or 108 can each be a femtocell access point (such as a Home Node B or Home evolved Node B, collectively referred to herein as H(e)NB), picocell access point, microcell access point, a mobile base station, a relay node, a device (e.g., communicating in peer-to-peer or ad-hoc mode), a portion thereof, and/or the like.

According to an example, device 102 can transmit to serving access point 104 at a transmit power, which can be controlled by the serving access point 104. In another example, serving access point 104 can communicate a transmission power cap to device 102, and device 102 can adhere to the transmission power cap. For example, device 102 can increase transmit power upon detecting degradation in signal quality from serving access point 104, detecting interference from other access points or devices communicating therewith, and/or the like. Increasing transmit power, however, can cause device 102 to interfere with access point 106, and/or devices communicating therewith such as device 110, access point 108, and/or device communicating therewith such as device 112, etc. In this regard, for example, serving access point 104 can evaluate one or more uplink communication parameters in determining whether to handover device 102 communications to another access point.

For example, serving access point 104 can determine a transmit power of device 102 and/or whether the transmit power is consistently reaching a transmission power cap assigned to the device 102. Where the transmit power is at a threshold level and/or where the transmit power reaches the cap (and/or a threshold level thereof), serving access point 104 can handover device 102 to one or more access points, such as access point 106 and/or 108.

In another example, serving access point 104 can determine a FER, setpoint, power control commands, etc. related to device 102, and can utilize the one or more metrics to determine whether to handover device 102. For example, a FER can relate to voice and/or data communications and can be at least one of measured based at least in part on control data received from device 102 regarding whether packets are successfully received, received by the device 102, and/or the like. For example, comparing FER to a threshold level can indicate a transmit power used by the device 102; for example, a higher FER can indicate the device 102 is not using a very high transmit power. In this example, location or distance of the device 102 relative to the serving access point 104 can also be used to determine whether the FER is to be expected or whether it is low or high. A setpoint, in one example, can correspond to a power that allows device 102 to achieve a certain signal-to-noise ratio (SNR), where the power can be determined by the serving access point 104 based at least in part on measuring a pilot signal received at device 102. The setpoint can thus indicate a transmit power used by the device 102, which can be used to determine whether device 102 may cause interference. A relative distance to the serving access point 104 can additionally be used in this example to determine whether the setpoint is higher or lower than expected given the distance. In addition, power control commands related to uplink communications of the device 102 can indicate whether the serving access point 104 is increasing the transmit power utilized by device 102. Where at least one of these parameters is over a threshold level, serving access point 104 can determine to handover device 102 to mitigate interference caused by increasing transmit power.

In yet another example, serving access point 104 can determine an uplink throughput corresponding to device 102 (e.g., based at least in part on a number of packets received therefrom over a period of time), and/or an uplink buffer size thereof. For example, these metrics can be an indication that headroom with respect to a transmission power cap is decreasing for the device 102 where the throughput is low (e.g., under a threshold level) or the buffer size is large (e.g., beyond a threshold level). This can also indicate potential interference by device 102 increasing transmit power. It is to be appreciated that this parameter can be relative to a resource grant provided to device 102 by serving access point 104, and thus, the uplink throughput and/or buffer size can be compared to a threshold based on the grant size to determine whether device 102 transmission power is nearing the transmission power cap.

In another example, serving access point 104 can evaluate one or more received parameters for determining whether to handover device 102. In one example, device 102 can communicate a downlink pilot signal Ec/Io (received pilot energy to total noise ratio), pathloss, etc., as received at device 102, to serving access point 104. Serving access point 104 can use such parameters to determine whether to handover device 102. Moreover, in an example, serving access point 104 can receive uplink loading and/or noise rise parameters from access point 106, where access point 106 is a candidate for receiving device 102 communications in handover. Serving access point 104 utilize this information to determine expected performance of device 102 at access point 106 for determining whether to handover device 102 thereto. It is to be appreciated that serving access point 104 can utilize a combination of the aforementioned parameters for determining whether to handover device 102. Moreover, for example, serving access point 104 can handover device 102 to an access point in a same or different operating frequency, relating to a same or different RAT, and/or the like.

Figure 2:
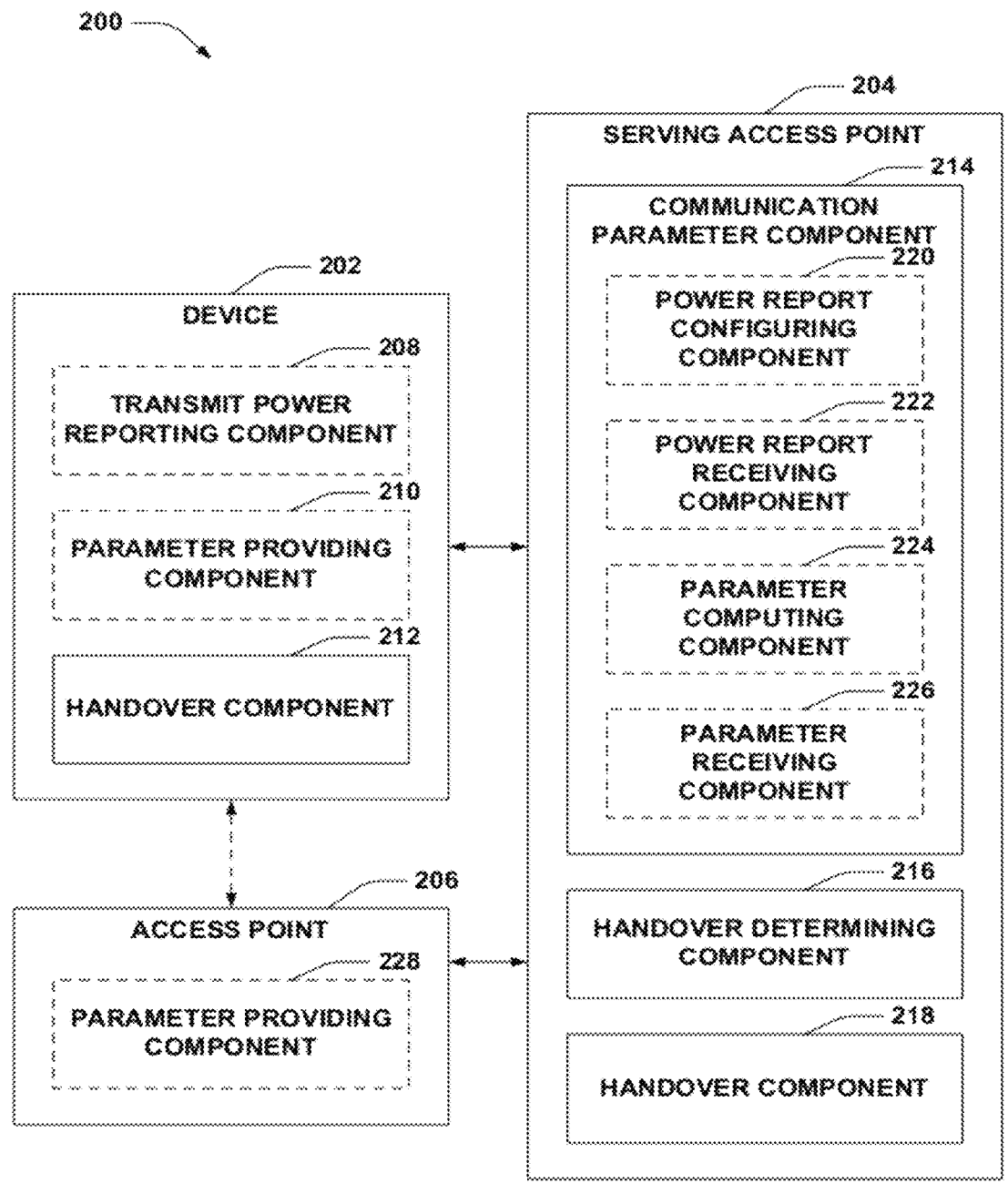
FIG. 2 is a block diagram of an example system for determining whether to handover a device to mitigate interference in a wireless network.

Turning to FIG. 2, an example wireless communication system 200 is illustrated that facilitates handing over device communications based on one or more communication parameters. System 200 comprises a device 202 that communicates with a serving access point 204 to receive access to one or more wireless network components, as described. In addition, system 200 can include another access point 206 to which device 202 can be handed over based at least in part on one or more communication parameters related to device 202. In one example, the one or more communication parameters relate to a transmit power utilized by device 202, and thus whether device 202 is potentially causing interference to one or more access points, such as access point 206, and/or devices communicating therewith, as described. For example, device 202 can be a UE, modem, etc., and serving access point 204 and access point 206 can each be a macrocell, femtocell, picocell, or similar access point, H(e) NB, and/or the like.

Device 202 can optionally comprise a transmit power reporting component 208 for communicating a transmit power to an access point, and/or a parameter providing component 210 for communicating one or more other parameters to the access point. Device 202 can also comprise a handover component 212 for performing handover from the access point to another access point.

Serving access point 204 can comprise a communication parameter component 214 for determining or otherwise obtaining one or more parameters related to device communications, a handover determining component 216 for determining whether to handover the device based at least in part on the one or more parameters, and a handover component 218 for performing handover of the device to another access point. In addition, communication parameter component 214 can optionally comprise a power report configuring component 220 for specifying one or more parameters to a device for reporting transmit power, and/or a power report receiving component 222 for obtaining the reported transmit power from the device. Communication parameter component 214 can also optionally comprise a parameter computing component 224 for determining one or more parameters related to communications of the device and/or a parameter receiving component 226 for obtaining one or more communication parameters from the device.

Access point 206 can optionally comprise a parameter providing component 228 for communicating one or more parameters to serving access point 204 for determining whether to handover device 202 thereto.

According to an example, device 202 can communicate with serving access point 204 to receive wireless network access. Device 202 can increase transmit power for communicating with serving access point 204, which can cause interference to one or more surrounding access points and/or devices communicating therewith. Thus, for example, serving access point 204 can evaluate one or more communication parameters related to device 202 and/or a transmit power thereof for determining whether to handover the device 202 to avoid such interference. Thus, for example, communication parameter component 214 can determine or otherwise obtain parameters related to device 202, and handover determining component 216 can determine whether to handover device 202 to access point 206 based on the one or more parameters. Where handover determining component 216 determines to handover device 202, handover component 218 can perform the handover.

For example, handover component 218 can have previously received measurement reports from device 202, and can determine an access point to which to handover device 202 based on the measurement reports (e.g., an access point for which a highest signal-to-noise ratio (SNR) is reported). For example, handover component 218 can select an access point for handover based on one or more additional or alternative considerations, such as whether the access point in the measurement report operates on a different frequency as serving access point 204, uses a different RAT than serving access point 204, etc., to further mitigate potential interference from device 202 to other access points and/or devices communicating therewith.

In one specific example, power report receiving component 222 can obtain one or more transmission power reports from device 202, and handover determining component 216 can determine whether to handover device 202 based at least in part on the one or more transmission power reports. In this example, transmit power reporting component 208 can send periodic transmission power reports to serving access point 204. This can be based on one or more received or configured parameters regarding communicating transmission power reports, such as a reporting frequency, one or more reporting events, (e.g., report when transmit power exceeds a transmission power cap or other threshold related to or independent of the transmission power cap), and/or the like. In one example, power report configuring component 220 can specify the one or more parameters regarding communicating transmission power reports to device 202. Transmit power reporting component 208 can obtain and utilize the one or more parameters for determining when to communicate transmission power reports to serving access point 204.

In this example, power report receiving component 222 can accordingly obtain one or more transmission power reports from device 202, and handover determining component 216 can determine whether to handover device 202 based at least in part on the transmission power reports. For example, handover determining component 216 can determine whether to handover device 202 based at least in part on information in the one or more transmission power reports, such as a transmit power indicated in the reports (e.g., whether the power is over a threshold level in a given report, in multiple reports, whether an average power over multiple reports is over a threshold level, etc.). In another example, where power report configuring component 220 configures device 202 to transmit transmission power reports when transmit power reaches a threshold level (e.g., a transmission power cap, within a threshold difference of the transmission power cap, etc.), handover determining component 216 can determine whether to handover device 202 based at least in part on a number of transmission power reports received from device 202 in a period of time. For example, if this number of reports is over a threshold number, this can indicate that device 202 is more likely interfering with an access point or devices communicating with one or more access points due to high transmit power; thus, handover component 218 can handover device 202 communications when handover determining component 216 so determines.

In another example, parameter computing component 224 can determine one or more parameters related to device 202 communications, which handover determining component 216 can utilize for determining whether to handover the device 202. For example, parameter computing component 224 can determine a FER, setpoint, power control commands, etc., relating to device 202. For example, parameter computing component 224 can determine the FER based at least in part on control information from device 202 regarding whether one or more frames are properly received (e.g., hybrid automatic repeat/request (HARQ) feedback from device 202). In any case, handover determining component 216 can compare the FER to a threshold FER, as described. Furthermore, in an example, handover determining component 216 can determine the threshold FER based at least in part on one or more parameters of the device 202 and/or serving access point 204, such as a relative distance between the device 202 and serving access point 204, or other parameters that can impact communication quality at device 202. Thus, for example, handover determining component 216 can determine an expected threshold FER at device 202, and can compare the FER to the expected threshold to determine whether transmit power at device 202 is nearing the transmission power cap.

Moreover, serving access point 204 can configure a setpoint for device 202 to achieve a SNR based at least in part on a pilot signal received from the device 202. In this example, handover determining component 216 can similarly determine an expected threshold setpoint based on the distance or location of device 202 relative to serving access point 204. Thus, comparing the setpoint to an expected threshold can indicate whether the device 202 is transmitting at a power near the transmission power cap (e.g., a higher setpoint can indicate transmit power is nearer to the transmission power cap than if the setpoint is lower than the expected threshold). In yet another example, parameter computing component 224 can determine one or more parameters related to communicating power control commands to device 202 (e.g., a number of power control commands communicated by serving access point 204 to device 202 over a period of time, whether the power control commands specify a power increase, a total power increase based on the power control commands, etc.). In any case, handover determining component 216 can compare the parameters to received or configured threshold values to determine whether to handover communications of device 202.

In another example, parameter receiving component 226 can obtain one or more parameters relating to uplink communication performance. For example, parameter providing component 210 can determine and communicate the one or more parameters to serving access point 204, such as an uplink throughput, an uplink buffer size, strength of a pilot signal received at device 202, pathloss experienced at device 202, and/or the like. For example, parameter providing component 210 can determine the uplink throughput based at least in part on a number of packets communicated to serving access point 204 over a period of time. In another example, parameter providing component 210 can determine the uplink buffer size based at least in part on a number of packets in the uplink buffer to be transmitted to serving access point 204, or one or more other access points, at a certain point in time. Moreover, for example, parameter providing component 210 can determine a Ec/Io or other signal quality measurement of a pilot signal from serving access point 204 and/or one or more access points, such as access point 206, and/or a pathloss thereto based on the pilot signal or other signals.

In this example, handover determining component 216 can similarly compare the one or more parameters received from device 202 to configured or received threshold values to determine whether to handover device 202. In addition, the comparison can be relative to one or more other values, as described. For example, uplink throughput can be measured relative to an uplink grant size received from the serving access point 204 to determine whether the device 202 transmit power is near the transmission power cap. For instance, a low throughput or high buffer size (e.g., relative to the related resource grant size) can indicate a high transmit power or a probable increase in transmit power to raise the throughput to lower the buffer size. A low Ec/Io of a pilot signal received at the device 202 can indicate a probable increase in transmit power, etc.

In yet another example, access point 206 can communicate one or more parameters to serving access point 204 relating to uplink communications at device 202. For example, this can occur based on a request from serving access point 204 (e.g., as part of the handover procedure) or otherwise. In an example, parameter providing component 228 can communicate to serving access point 204 one or more performance parameters related to uplink loading and/or noise floor at access point 206. For example, parameter providing component 228 can communicate the performance parameters over a backhaul link or broadcast message to serving access point 204. Parameter receiving component 226 can accordingly obtain the one or more performance parameters, and handover determining component 216 can compare the one or more performance parameters to determine whether to handover device 202 to access point 206. In this example, the performance parameters related to uplink loading and/or noise floor can be used to determine an expected performance of device 202 when communicating with access point 206. For example, this can include comparing the one or more performance parameters to performance threshold values (e.g., a threshold uplink loading, noise floor, etc. used to indicate whether a device should be handed over to the access points). Thus, if handover determining component 216 determines the performance parameters are at least at a threshold level, handover component 218 can handover device 202 to access point 206 to mitigate interference to other access points or devices communicating therewith, as described.

Figure 3:
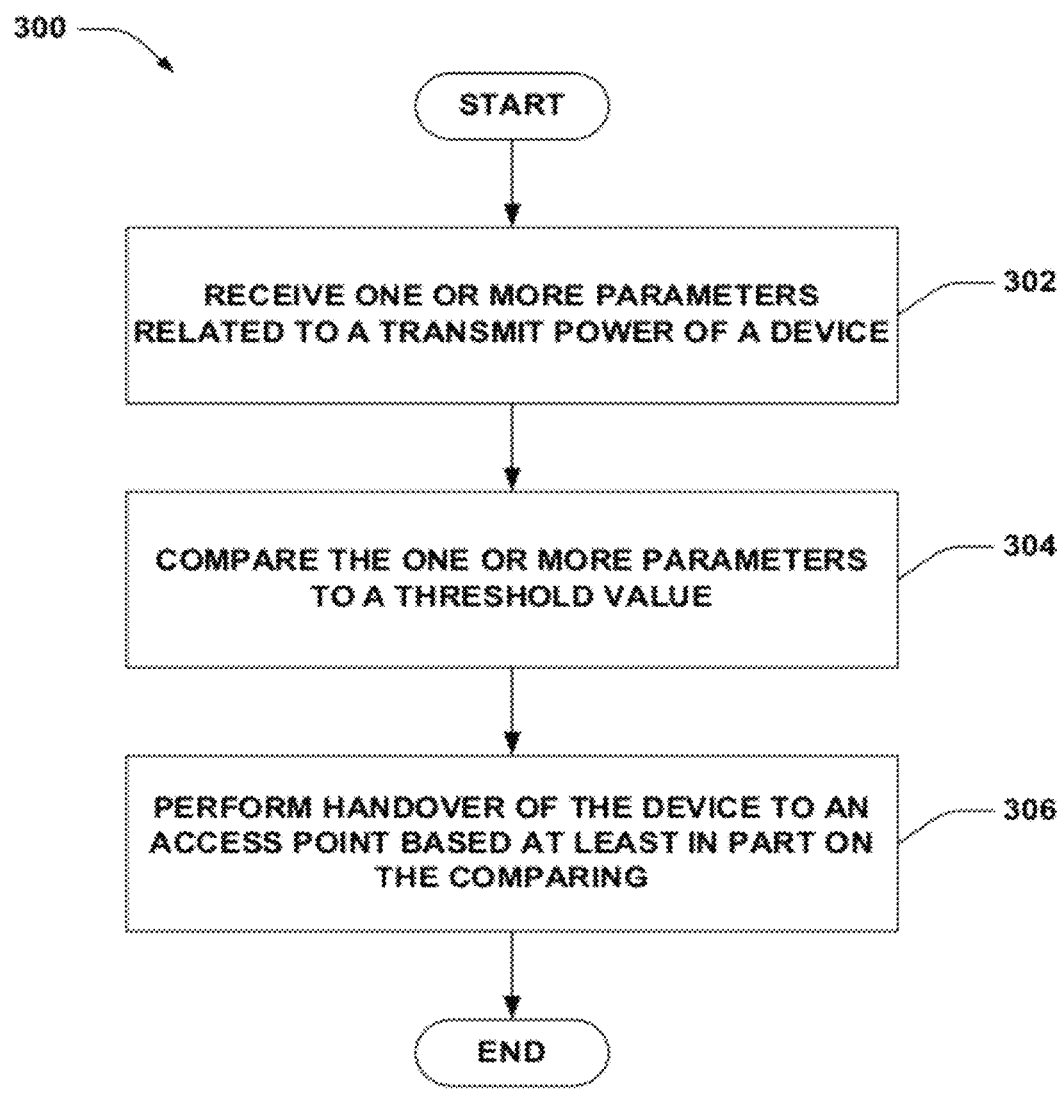
FIG. 3 is a flow chart of an aspect of an example methodology for performing handover of device communications based on one or more parameters.
Figure 4:
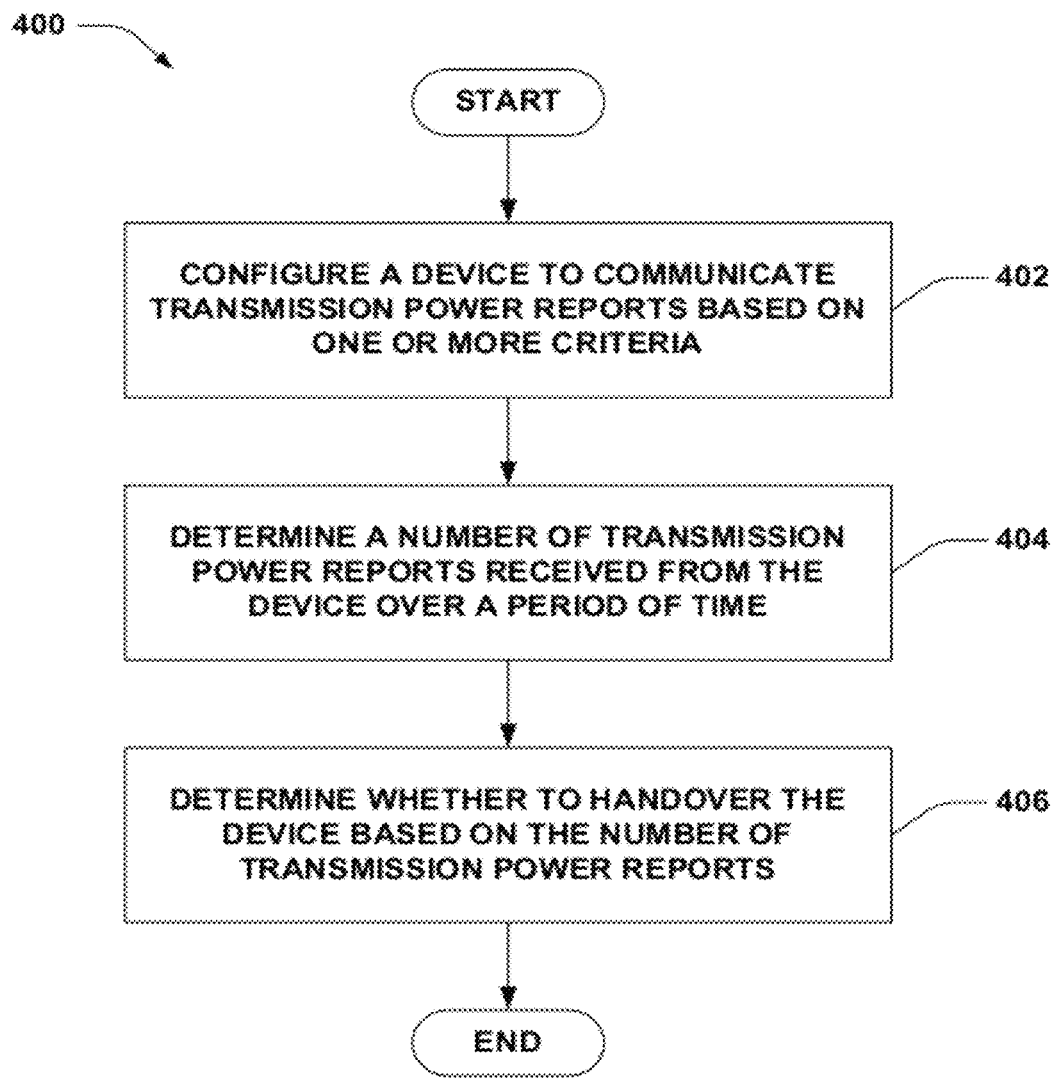
FIG. 4 is a flow chart of an aspect of an example methodology for determining whether to handover device communications based on a number of transmission power reports.
Figure 5:
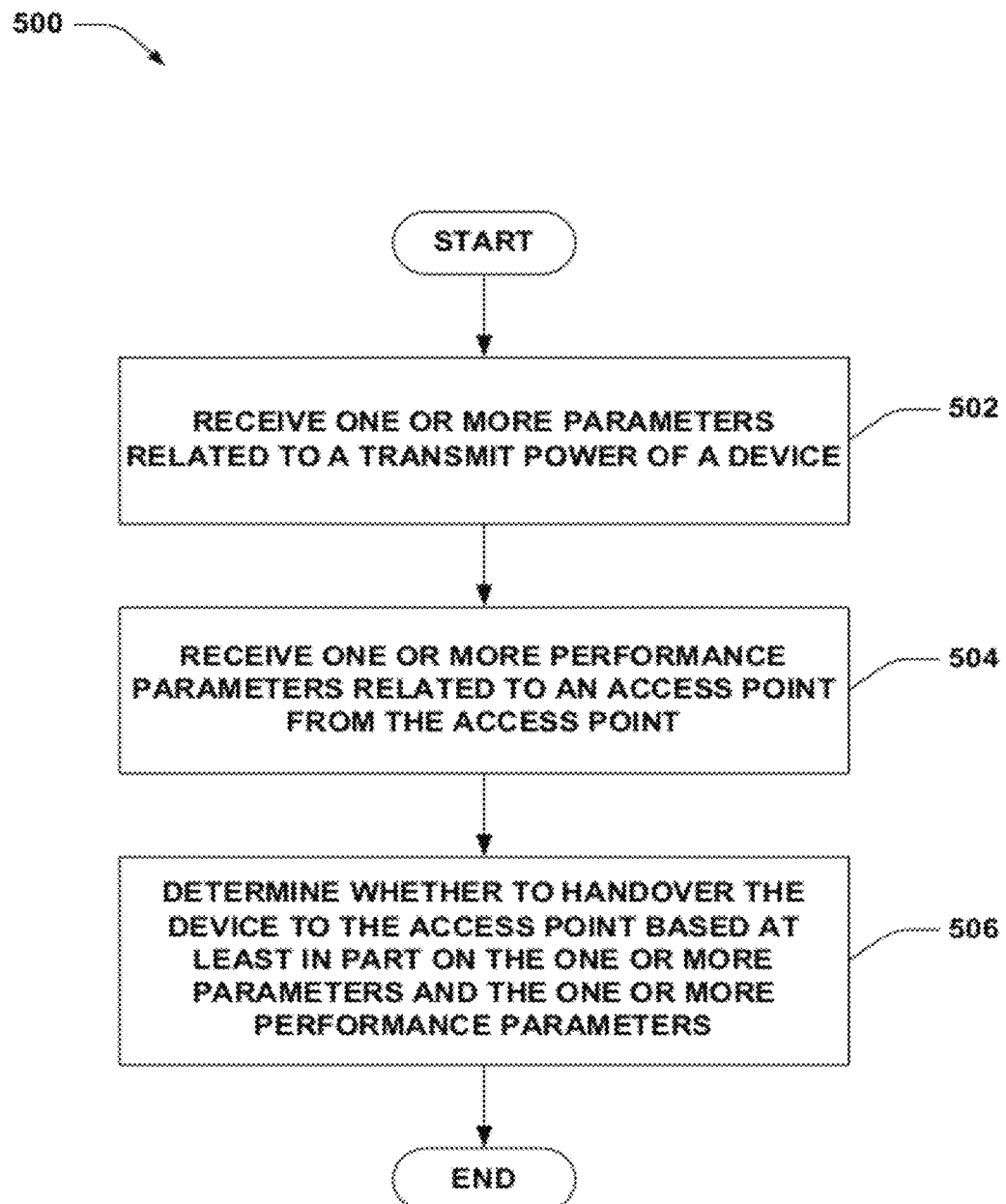
FIG. 5 is a flow chart of an aspect of an example methodology that determines whether to handover device communications based on various parameters.

Referring to FIGS. 3-5, example methodologies relating to handing over a device to mitigate interference in a wireless network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 3, an example methodology 300 is displayed that facilitates performing handover of a device to mitigate interference in a wireless network. At 302, one or more parameters related to a transmit power of a device can be received. For example, this can include receiving one or more parameters from a device, such as an uplink throughput, an uplink buffer size, strength of a received pilot signal, pathloss, etc. In another example, this can include determining one or more parameters based at least in part on communications with the device, such as a number of transmission power reports received from the device over a period of time, a FER, setpoint, parameters related to one or more power control commands communicated to the device, and/or the like. At 304, the one or more parameters can be compared to a threshold value. At 306, handover of the device to an access point can be performed based at least in part on the comparing. Thus, for example, where the one or more parameters indicated that a device may interfere with other access points or devices based on the threshold value, the device can be handed over to another access point. Moreover, the other access point can be selected for handover of the device based at least in part on determining the other access point communicates on a different operating frequency and/or using a different RAT.

Turning to FIG. 4, an example methodology 400 is displayed that facilitates determining whether to handover a device to mitigate interference in a wireless network. At 402, a device can be configured to communicate transmission power reports based on one or more criteria. For example, the device can be configured to communicate transmission power reports when a transmit power at the device reaches a threshold level (e.g., the transmission power cap, a threshold level from the transmission power cap, etc.). Thus, the device can communicate one or more transmission power reports based on the criteria. At 404, a number of transmission power reports received from the device over a period of time can be determined. At 406, whether to handover the device can be determined based on the number of transmission power reports. Thus, for example, if the number of transmission power reports over the period of time exceeds a threshold, this can indicate that the device is running out of power headroom with respect to a transmission power cap, and thus may be interfering with one or more access points or devices. Accordingly, the device can be handed over to a different access point.

Referring to FIG. 5, an example methodology 500 for determining whether to handover a device to mitigate wireless network interference is illustrated. At 502, one or more parameters related to a transmit power of a device can be received. For example, this can include receiving one or more parameters from a device, such as an uplink throughput, an uplink buffer size, strength of a received pilot signal, etc. In another example, this can include determining one or more parameters based at least in part on communications with the device, such as a number of transmission power reports received from the device over a period of time, a FER, setpoint, parameters related to one or more power control commands communicated to the device, and/or the like. At 504, one or more performance parameters related to an access point can be received from the access point. For example, the one or more performance parameters can correspond to a uplink loading at the access point, a noise rise at the access point, etc., which can indicate or can be used to determine an expected performance of the device at the access point. Thus, at 506, it can be determined whether to handover the device to the access point based at least in part on the one or more parameters and the one or more performance parameters. Thus, if the access point has a high uplink loading or noise rise, another access point can be considered for handover and/or handover to the access point can be otherwise prevented.

It will be appreciated that, in accordance with one or more aspects described herein, inferences can be made regarding determining whether to handover a device based on one or more parameters related to a transmit power thereof, performance parameters of an access point, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
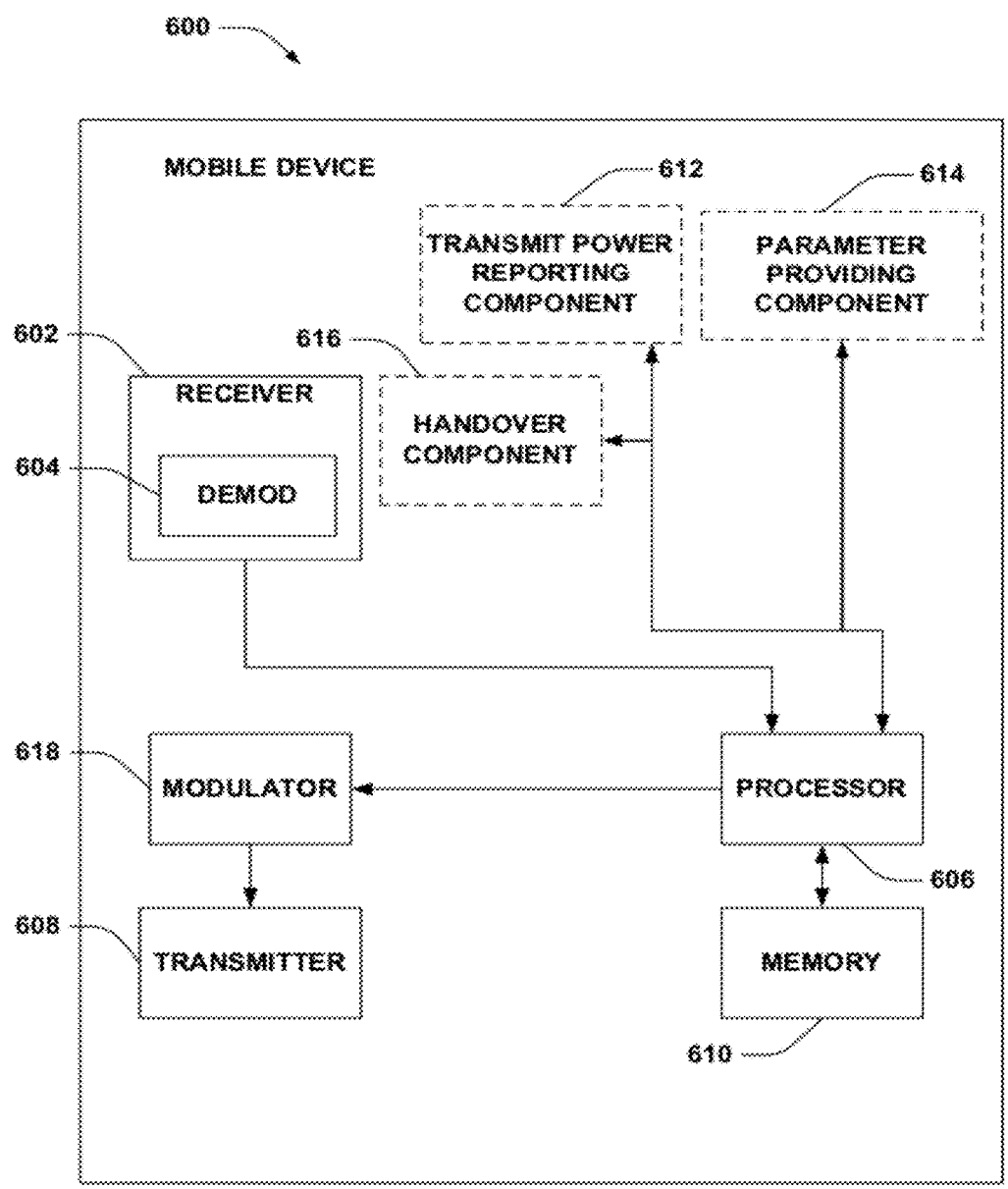
FIG. 6 is a block diagram of an example mobile device according to various aspects described herein.

FIG. 6 is an illustration of a mobile device 600 that facilitates reporting transmit power or one or more parameters for mitigating interference in a wireless network. Mobile device 600 comprises a receiver 602 that receives a signal from, for instance, a receive antenna (not shown), performs typical actions on (e.g., filters, amplifies, down-converts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 608, a processor that controls one or more components of mobile device 600, and/or a processor that both analyzes information received by receiver 602, generates information for transmission by transmitter 608, and controls one or more components of mobile device 600.

Mobile device 600 can additionally comprise memory 610 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 610 can additionally store protocols and/or algorithms associated with estimating and/or utilizing a channel (e.g., performance based, capacity based, etc.).

It will be appreciated that the data store (e.g., memory 610) described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory.

Processor 606 can further be optionally operatively coupled to a transmit power reporting component 612, which can be similar to transmit power reporting component 208, a parameter providing component 614, which can be similar to parameter providing component 210, and/or a handover component 616, which can be similar to handover component 212. Mobile device 600 still further comprises a modulator 618 that modulates signals for transmission by transmitter 608 to, for instance, a base station, another mobile device, etc. Moreover, for example, mobile device 600 can comprise multiple transmitters 608 for multiple network interfaces, as described. Although depicted as being separate from the processor 606, it is to be appreciated that the transmit power reporting component 612, parameter providing component 614, handover component 616, demodulator 604, and/or modulator 618 can be part of the processor 606 or multiple processors (not shown).

Figure 7:
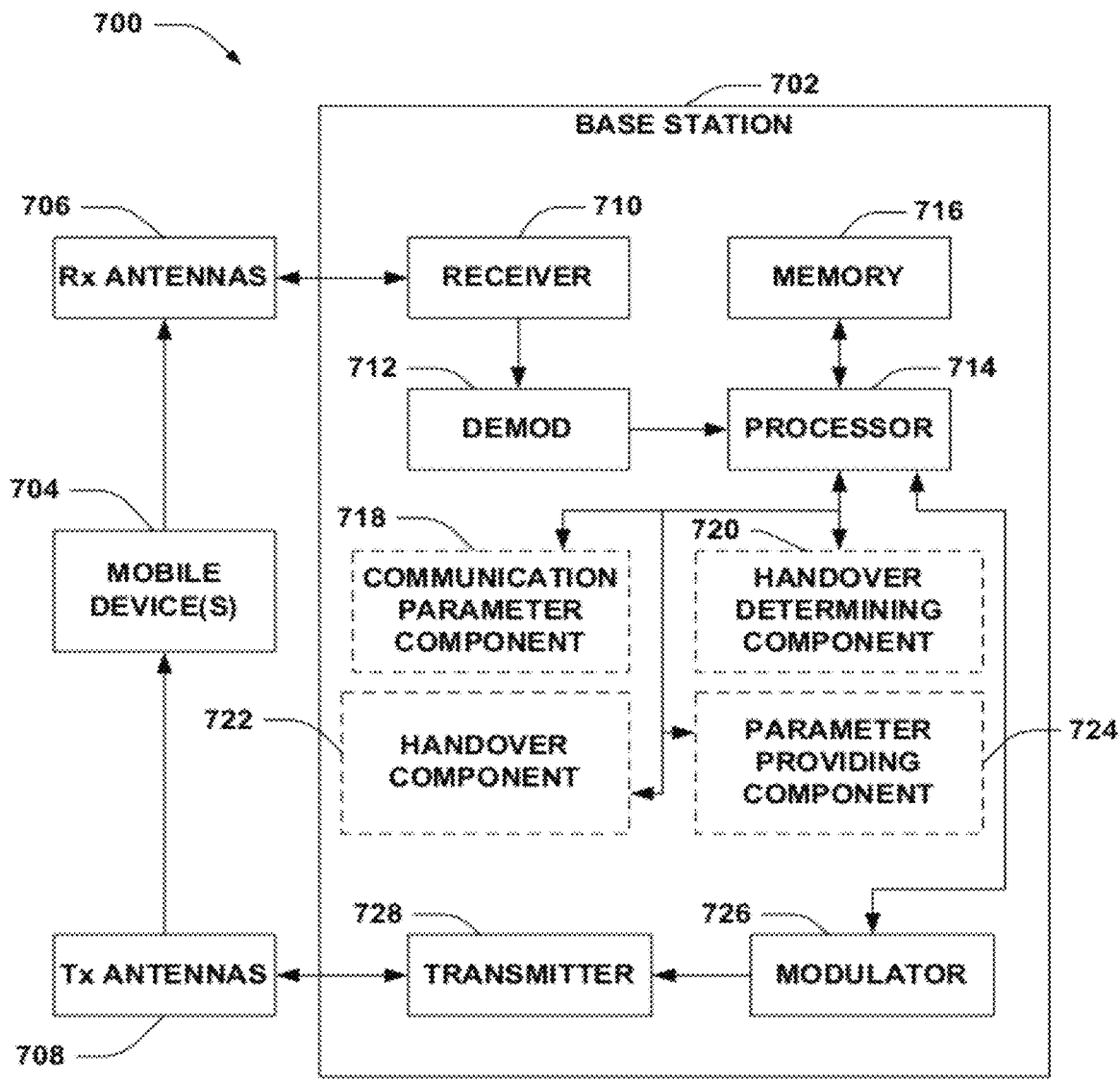
FIG. 7 is a block diagram of an example system for determining whether to handover a device to mitigate interference.

FIG. 7 is an illustration of a system 700 that facilitates communicating with one or more devices using wireless communications. System 700 comprises a base station 702, which can be substantially any base station (e.g., a small base station, such as a femtocell, picocell, etc., mobile base station . . . ), a relay, etc., having a receiver 710 that receives signal(s) from one or more mobile devices 704 through a plurality of receive antennas 706 (e.g., which can be of multiple network technologies, as described), and a transmitter 728 that transmits to the one or more mobile devices 704 through a plurality of transmit antennas 708 (e.g., which can be of multiple network technologies, as described). In addition, in one example, transmitter 728 can transmit to the mobile devices 704 over a wired front link. Receiver 710 can receive information from one or more receive antennas 706 and is operatively associated with a demodulator 712 that demodulates received information. In addition, in an example, receiver 710 can receive from a wired backhaul link. Moreover, though shown as separate antennas, it is to be appreciated that at least one transmit antenna 708 can be combined with at least one receive antenna 706 as a single antenna. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Processor 714 is further optionally coupled to a communication parameter component 718, which can be similar to communication parameter component 214, a handover determining component 720, which can be similar to handover determining component 216, a handover component 722, which can be similar to handover component 218, and/or a parameter providing component 724, which can be similar to parameter providing component 228. Moreover, for example, processor 714 can modulate signals to be transmitted using modulator 726, and transmit modulated signals using transmitter 728. Transmitter 728 can transmit signals to mobile devices 704 over Tx antennas 708. Furthermore, although depicted as being separate from the processor 714, it is to be appreciated that the communication parameter component 718, handover determining component 720, handover component 722, parameter providing component 724, demodulator 712, and/or modulator 726 can be part of the processor 714 or multiple processors (not shown), and/or stored as instructions in memory 716 for execution by processor 714.

Figure 8:
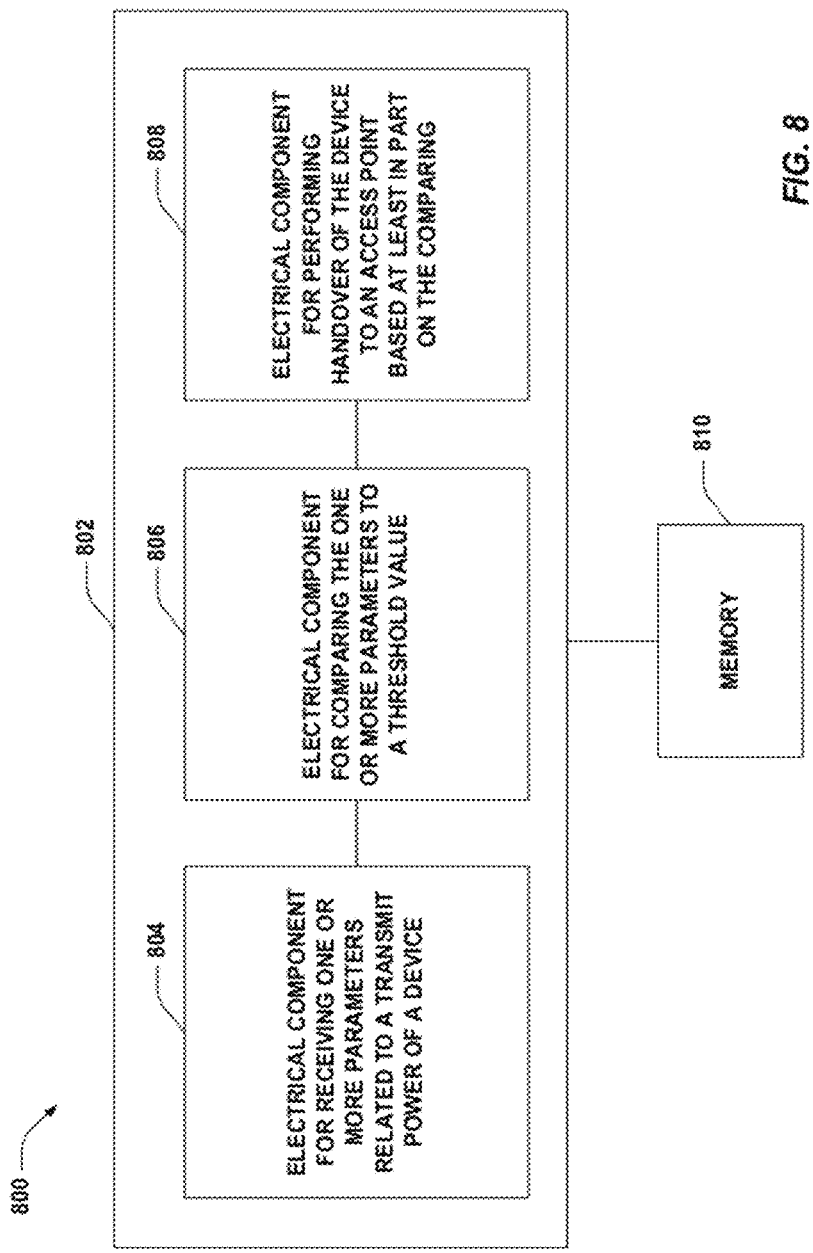
FIG. 8 is a block diagram of an example system that performs handover of device communications based on one or more parameters.

With reference to FIG. 8, illustrated is a system 800 for determining a transmission power cap for a device. For example, system 800 can reside at least partially within an access point. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving one or more parameters related to a transmit power of a device 804. For example, this can include receiving one or more parameters from a device, such as an uplink throughput, an uplink buffer size, strength of a received pilot signal, etc. In another example, this can include determining one or more parameters based at least in part on communications with the device, such as a number of transmission power reports received from the device over a period of time, a FER, setpoint, parameters related to one or more power control commands communicated to the device, etc.

Further, logical grouping 802 can comprise an electrical component for comparing the one or more parameters to a threshold value 806. For example, the comparison can be used to determine whether to handover the device to mitigate interference, as described. Thus, logical grouping 802 can also comprise an electrical component for performing handover of the device to an access point based at least in part on the comparing 808. In addition, other parameters can be considered for determining whether to handover the device, such as one or more performance parameters of the access point, as described. For example, electrical component 804 can include a communication parameter component 214, as described above, and/or one or more components thereof. In addition, for example, electrical component 806, in an aspect, can include handover determining component 216, as described above. Moreover, electrical component 808 can include a handover component 218, as described.

Additionally, system 800 can include a memory 810 that retains instructions for executing functions associated with the electrical components 804, 806, and 808. While shown as being external to memory 810, it is to be understood that one or more of the electrical components 804, 806, and 808 can exist within memory 810. In one example, electrical components 804, 806, and 808 can comprise at least one processor, or each electrical component 804, 806, and 808 can be a corresponding module of at least one processor. Moreover, in an additional or alternative example, electrical components 804, 806, and 808 can be a computer program product comprising a computer readable medium, where each electrical component 804, 806, and 808 can be corresponding code.

Figure 9:
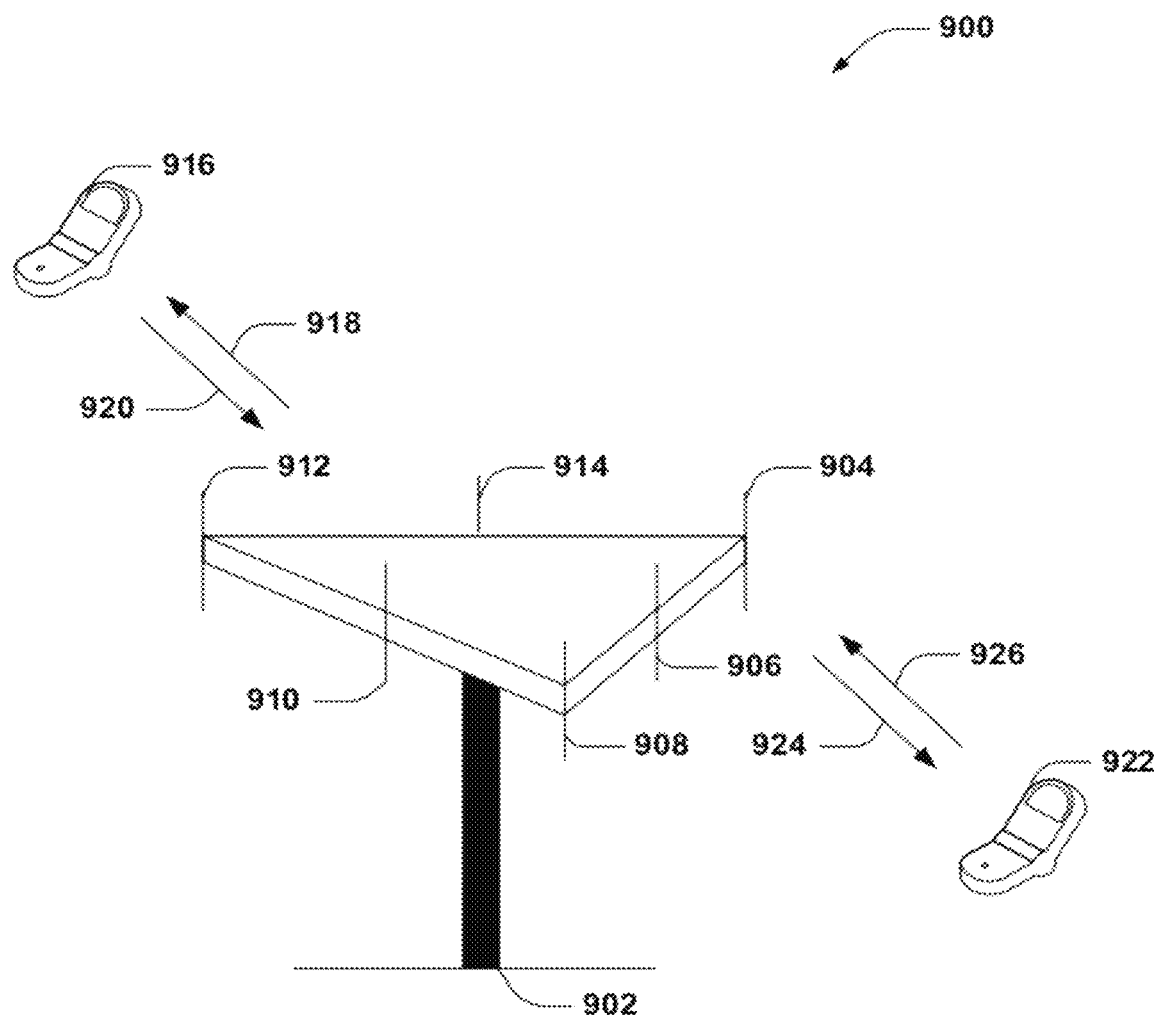
FIG. 9 is a block diagram of an example wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology as depicted. According to an example, system 900 can be a multiple-input multiple-output (MIMO) communication system. In addition, for example, base station 902 can determine whether to handover device 916 and/or 922 based on one or more parameters related to uplink communications or transmit power thereof, as described.

Figure 10:
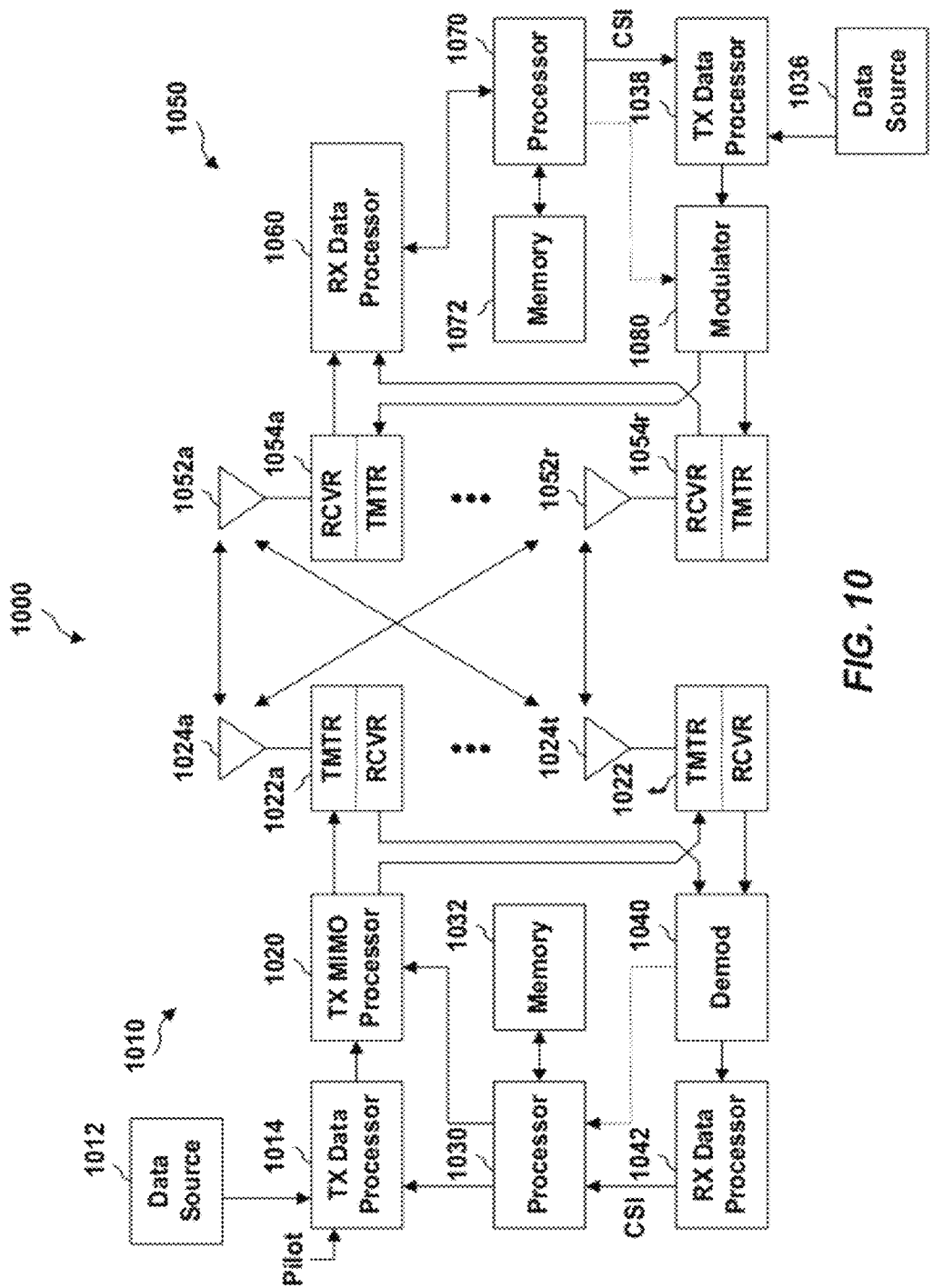
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-2 and 7-9), mobile devices, (FIG. 6), and/or methods (FIGS. 3-5) described herein to facilitate wireless communication there between. For example, components or functions of the systems and/or methods described herein can be part of a memory 1032 and/or 1072 or processors 1030 and/or 1070 described below, and/or can be executed by processors 1030 and/or 1070 to perform the disclosed functions.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can determine whether to handover device 1050 communications based at least in part on one or more parameters related to uplink communications thereof and/or transmit power thereof.

Figure 11:
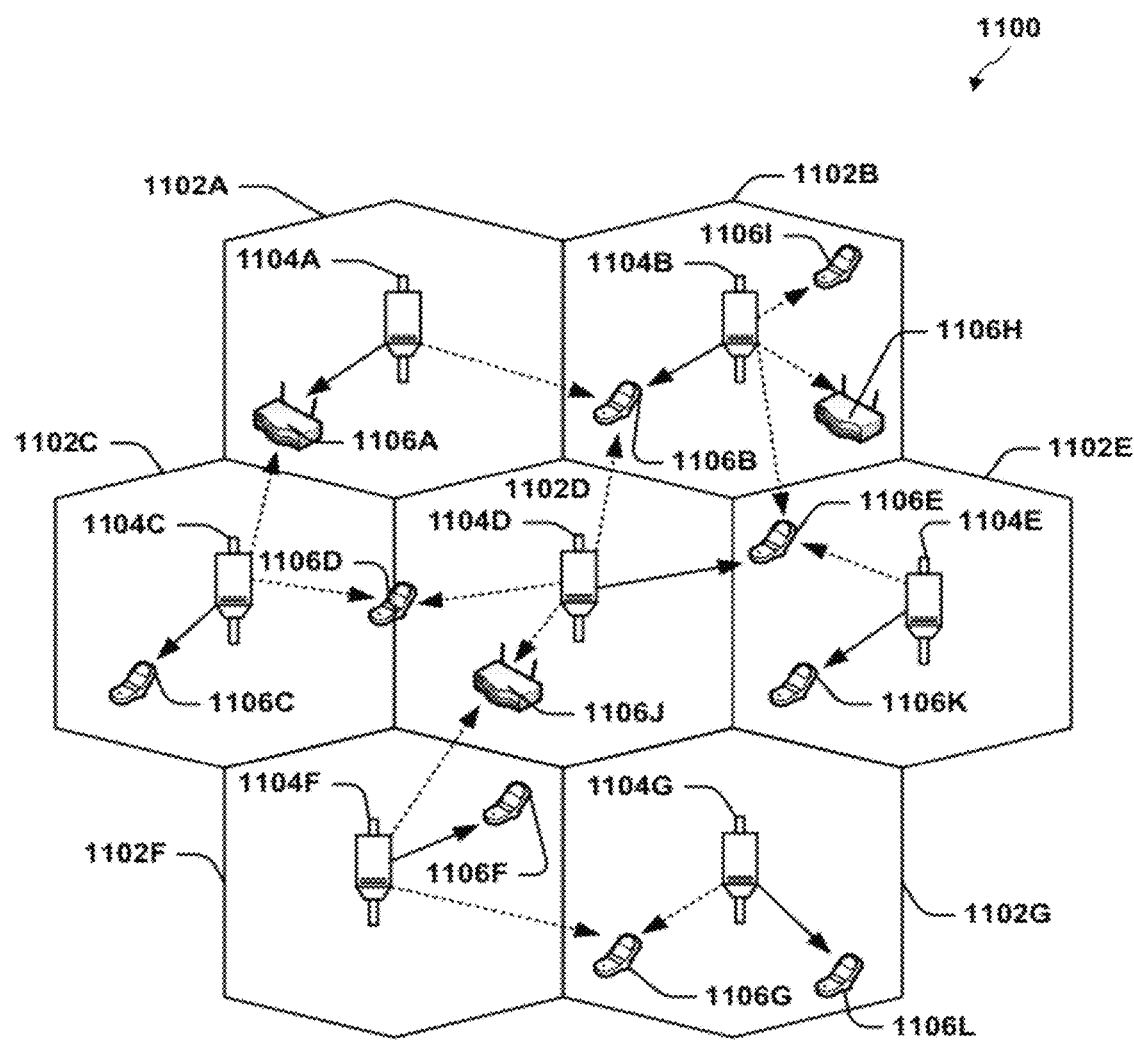
FIG. 11 illustrates an example wireless communication system, configured to support a number of devices, in which the aspects herein can be implemented.

FIG. 11 illustrates a wireless communication system 1100, configured to support a number of users, in which the teachings herein may be implemented. The system 1100 provides communication for multiple cells 1102, such as, for example, macro cells 1102A-1102G, with each cell being serviced by a corresponding access node 1104 (e.g., access nodes 1104A-1104G). As shown in FIG. 11, access terminals 1106 (e.g., access terminals 1106A-1106L) can be dispersed at various locations throughout the system over time. Each access terminal 1106 can communicate with one or more access nodes 1104 on a forward link (FL) and/or a reverse link (RL) at a given moment, depending upon whether the access terminal 1106 is active and whether it is in soft handoff, for example. The wireless communication system 1100 can provide service over a large geographic region.

Figure 12:
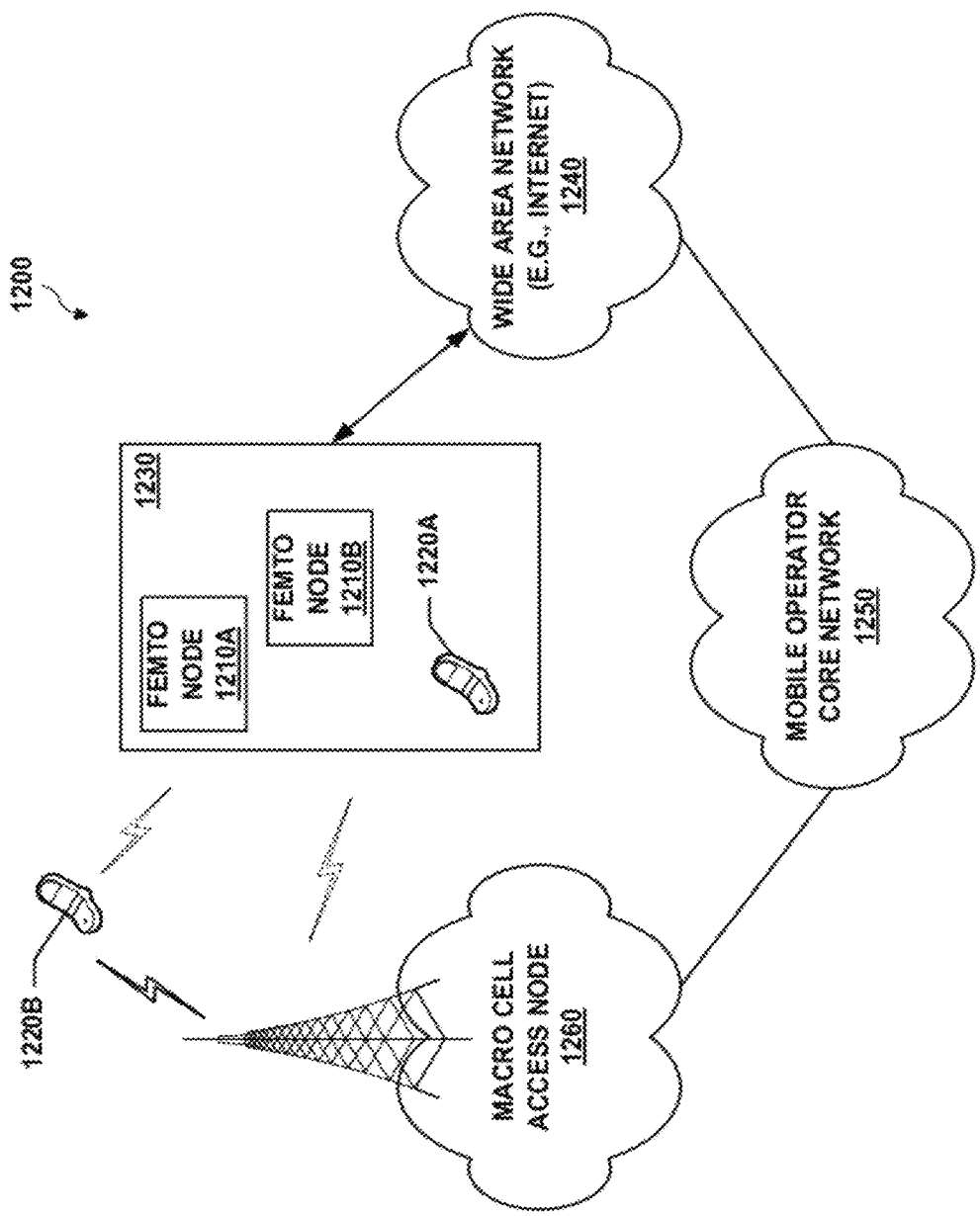
FIG. 12 is an illustration of an exemplary communication system to enable deployment of femtocells within a network environment.

FIG. 12 illustrates an exemplary communication system 1200 where one or more femto nodes are deployed within a network environment. Specifically, the system 1200 includes multiple femto nodes 1210A and 1210B (e.g., femtocell nodes or H(e)NB) installed in a relatively small scale network environment (e.g., in one or more user residences 1230). Each femto node 1210 can be coupled to a wide area network 1240 (e.g., the Internet) and a mobile operator core network 1250 via a digital subscriber line (DSL) router, a cable modem, a wireless link, or other connectivity means (not shown). As will be discussed below, each femto node 1210 can be configured to serve associated access terminals 1220 (e.g., access terminal 1220A) and, optionally, alien access terminals 1220 (e.g., access terminal 1220B). In other words, access to femto nodes 1210 can be restricted such that a given access terminal 1220 can be served by a set of designated (e.g., home) femto node(s) 1210 but may not be served by any non-designated femto nodes 1210 (e.g., a neighbor's femto node).

Figure 13:
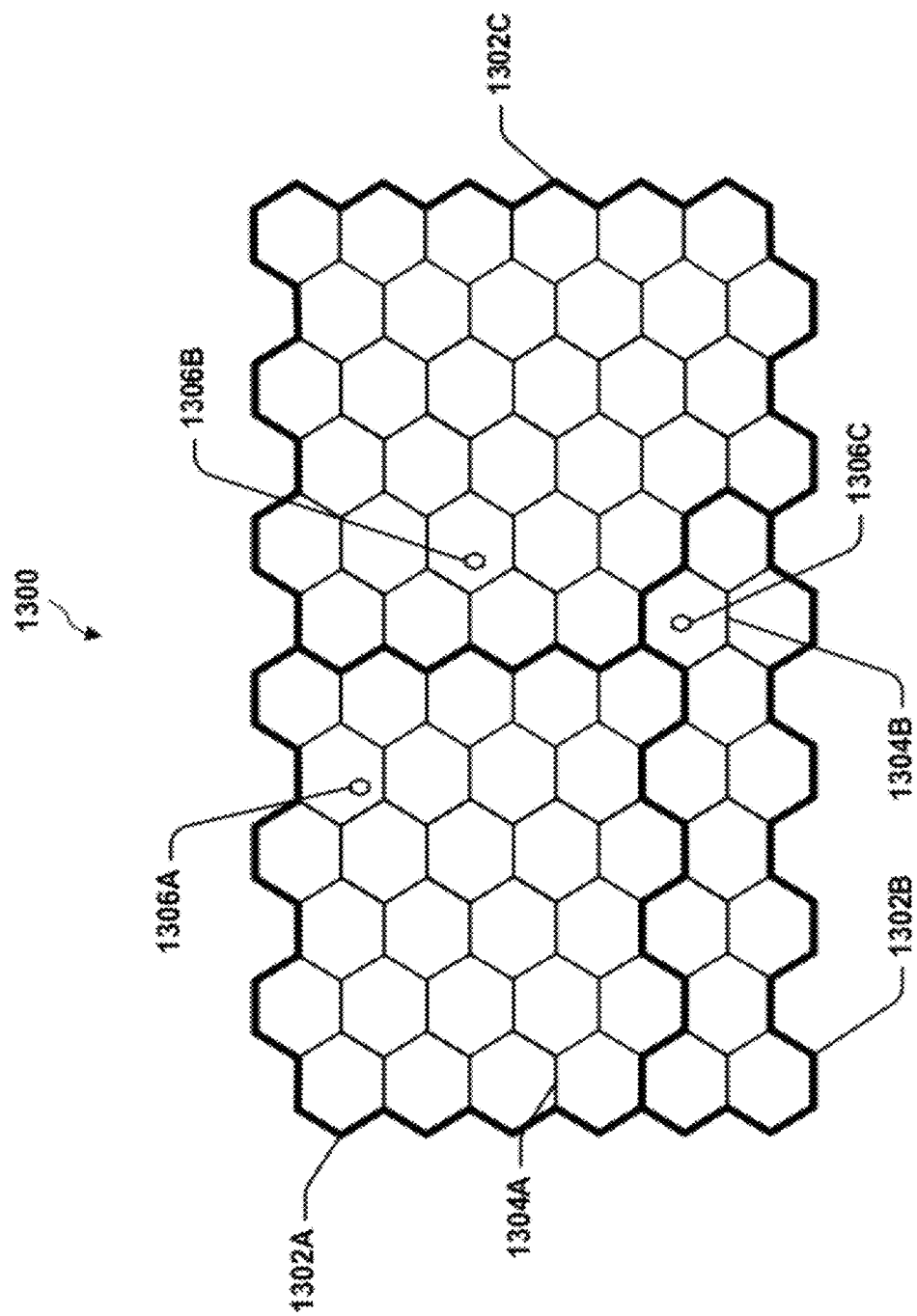
FIG. 13 illustrates an example of a coverage map having several defined tracking areas.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 can be defined with a given tracking area 1302 or macro coverage area 1304. Also, one or more pico coverage areas (not shown) can be defined within a given tracking area 1302 or macro coverage area 1304.

Referring again to FIG. 12, the owner of a femto node 1210 can subscribe to mobile service, such as, for example, 3G mobile service, offered through the mobile operator core network 1250. In addition, an access terminal 1220 can be capable of operating both in macro environments and in smaller scale (e.g., residential) network environments. Thus, for example, depending on the current location of the access terminal 1220, the access terminal 1220 can be served by an access node 1260 or by any one of a set of femto nodes 1210 (e.g., the femto nodes 1210A and 1210B that reside within a corresponding user residence 1230). For example, when a subscriber is outside his home, he is served by a standard macro cell access node (e.g., node 1260) and when the subscriber is at home, he is served by a femto node (e.g., node 1210A). Here, it should be appreciated that a femto node 1210 can be backward compatible with existing access terminals 1220.

A femto node 1210 can be deployed on a single frequency or, in the alternative, on multiple frequencies. Depending on the particular configuration, the single frequency or one or more of the multiple frequencies can overlap with one or more frequencies used by a macro cell access node (e.g., node 1260). In some aspects, an access terminal 1220 can be configured to connect to a preferred femto node (e.g., the home femto node of the access terminal 1220) whenever such connectivity is possible. For example, whenever the access terminal 1220 is within the user's residence 1230, it can communicate with the home femto node 1210.

In some aspects, if the access terminal 1220 operates within the mobile operator core network 1250 but is not residing on its most preferred network (e.g., as defined in a preferred roaming list), the access terminal 1220 can continue to search for the most preferred network (e.g., femto node 1210) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1220 can limit the search for specific band and channel. For example, the search for the most preferred system can be repeated periodically. Upon discovery of a preferred femto node, such as femto node 1210, the access terminal 1220 selects the femto node 1210 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1210 that reside within the corresponding user residence 1230). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for mitigating interference in a wireless network, comprising:
   receiving, at a femto access point from a device served by the femto access point, a plurality of transmission power reports from the device that indicate the transmit power utilized by the device;
   receiving, at the femto access point from the device served by the femto access point, one or more parameters related to a decrease in a transmit power headroom at the device with respect to a transmission power cap, the transmission power cap is communicated from the femto access point to the device and used in uplink communications by the device, wherein the receiving the one or more parameters comprises determining a number of the plurality of transmission power reports received from the device over a period of time;
   comparing, at the femto access point, the one or more parameters to a threshold value to determine whether the device is potentially causing interference to communications of one or more macro access points; and
   performing a handover of the device from the femto access point to a different macro access point based at least in part on the comparing.

2. The method of claim 1, further comprising configuring the device to transmit the plurality of transmission power reports based at least in part on reaching a threshold transmit power at the device.

3. The method of claim 1, wherein the receiving the one or more parameters further comprises determining a frame error rate, a setpoint, or parameters of one or more power control commands related to the uplink communications.

4. The method of claim 1, further comprising receiving one or more other parameters related to an uplink throughput, an uplink buffer size, a strength of a received pilot signal, or a pathloss from the device, wherein the performing the handover of the device is further based at least in part on the one or more other parameters.

5. The method of claim 4, wherein the one or more other parameters relates to the strength of the received pilot signal, and wherein the performing the handover of the device comprises performing the handover where the strength of the received pilot signal is less than a threshold strength.

6. The method of claim 1, further comprising receiving one or more performance parameters from the different macro access point, wherein the performing the handover of the device to the different macro access point is further based at least in part on comparing the one or more performance parameters to a performance threshold value.

7. The method of claim 6, wherein the one or more performance parameters further comprise an uplink loading or a noise rise related to the different macro access point.

8. The method of claim 1, further comprising:
   receiving a measurement report from the device; and
   selecting the different macro access point from the measurement report for the handover based at least in part on determining that the different macro access point operates using a different frequency or using a different radio access technology than the femto access point.

9. The method of claim 1, wherein the device is subject to interference from at least one other device served by at least one other access point.

10. A femto access point for mitigating interference in a wireless network, comprising:
    at least one processor configured to:
      receive, at the femto access point from a device served by the femto access point, a plurality of transmission power reports from the device that indicate the transmit power utilized by the device;
      receive, at the femto access point from the device served by the femto access point, one or more parameters related to a decrease in a transmit power headroom at the device with respect to a transmission power cap, the transmission power cap is communicated from the femto access point to the device and used in uplink communications by the device, wherein the one or more parameters correspond to a determined number of the plurality of transmission power reports received from the device over a period of time;
      compare, at the femto access point, the one or more parameters to a threshold value to determine whether the device is potentially causing interference to communications of one or more macro access points; and
      perform a handover of the device from the femto access point to a different macro access point based at least in part on the comparing; and
    a memory coupled to the at least one processor.

11. The femto access point of claim 10, wherein the at least one processor is further configured to configure the device to transmit the plurality of transmission power reports based at least in part on reaching a threshold transmit power at the device.

12. The femto access point of claim 10, wherein the at least one processor is further configured to receive the one or more parameters at least in part by determining a frame error rate, a setpoint, or parameters of one or more power control commands related to the uplink communications.

13. The femto access point of claim 10, wherein the at least one processor is further configured to receive one or more other parameters corresponding to an uplink throughput, an uplink buffer size, a strength of a received pilot signal, or a pathloss received from the device, wherein the at least one processor performs the handover of the device further based at least in part on the one or more other parameters.

14. The femto access point of claim 10, wherein the at least one processor is further configured to receive one or more performance parameters from the different macro access point, and wherein the at least one processor performs the handover of the device to the different macro access point further based at least in part on comparing the one or more performance parameters to a performance threshold value.

15. The femto access point of claim 14, wherein the one or more performance parameters further comprise an uplink loading or a noise rise related to the different macro access point.

16. The femto access point of claim 10, wherein the at least one processor is further configured to:
   receive a measurement report from the device; and
   select the different macro access point from the measurement report for the handover based at least in part on determining that the different macro access point operates using a different frequency or using a different radio access technology than the femto access point.

17. A femto access point for mitigating interference in a wireless network, comprising:
   means for receiving, at the femto access point from a device served by the femto access point, a plurality of transmission power reports from the device that indicate the transmit power utilized by the device, and one or more parameters related to a decrease in a transmit power headroom with respect to a transmission power cap, the transmission power cap is communicated from the femto access point to the device and used in uplink communications by the device, wherein the means for receiving the one or more parameters determines the one or more parameters as a number of the plurality of transmission power reports received from the device over a period of time;
   means for comparing, at the femto access point, the one or more parameters to a threshold value to determine whether the device is potentially causing interference to communications of one or more macro access points; and
   means for performing a handover of the device from the femto access point to a different macro access point based at least in part on the comparing.

18. The femto access point of claim 17, further comprising means for configuring the device to transmit the plurality of transmission power reports based at least in part on reaching a threshold transmit power at the device.

19. The femto access point of claim 17, wherein the means for receiving further determines the one or more parameters as a frame error rate, a setpoint, or parameters of one or more power control commands related to the uplink communications.

20. The femto access point of claim 17, wherein the means for receiving further receives one or more other parameters corresponding to an uplink throughput, an uplink buffer size, a strength of a received pilot signal, or a pathloss received from the device, wherein the means for performing performs the handover of the device further based at least in part on the one or more other parameters.

21. The femto access point of claim 17, wherein the means for receiving further receives one or more performance parameters from the different macro access point, and wherein the means for comparing compares the one or more performance parameters to a performance threshold value to determine whether to perform the handover.

22. The femto access point of claim 21, wherein the one or more performance parameters further comprise an uplink loading or a noise rise related to the different macro access point.

23. The femto access point of claim 17, wherein the means for performing handover further selects the different macro access point based at least in part on determining that the different macro access point operates using a different frequency or using a different radio access technology than the femto access point.

24. A non-transitory computer-readable medium for mitigating interference in a wireless network, comprising:
   code for causing at least one computer to receive, at a femto access point from a device served by the femto access point, a plurality of transmission power reports from the device that indicate the transmit power utilized by the device;
   code for causing the at least one computer to receive, at the femto access point from the device served by the femto access point, one or more parameters related to a decrease in a transmit power headroom at the device with respect to a transmission power cap, the transmission power cap is communicated from the femto access point to the device and used in uplink communications by the device, wherein the one or more parameters correspond to a determined number of the plurality of transmission power reports received from the device over a period of time;
   code for causing the at least one computer to compare, at the femto access point, the one or more parameters to a threshold value to determine whether the device is potentially causing interference to communications of one or more macro access points; and
   code for causing the at least one computer to perform a handover of the device from the femto access point to a different macro access point based at least in part on the comparing.

25. The non-transitory computer-readable medium of claim 24, further comprising code for causing the at least one computer to configure the device to transmit the plurality of transmission power reports based at least in part on reaching a threshold transmit power at the device.

26. The non-transitory computer-readable medium of claim 24, wherein the code for causing the at least one computer to receive further determines the one or more parameters as a frame error rate, a setpoint, or parameters of one or more power control commands related to the uplink communications.

27. The non-transitory computer-readable medium of claim 24, wherein code for causing the at least one computer to receive further receives one or more other parameters corresponding to an uplink throughput, an uplink buffer size, a strength of a received pilot signal, or a pathloss received from the device, wherein the code for causing the at least one computer to perform the handover performs the handover of the device further based at least in part on the one or more other parameters.

28. The non-transitory computer-readable medium of claim 24, further comprising code for causing the at least one computer to receive one or more performance parameters from the different macro access point, and wherein the code for causing the at least one computer to perform performs the handover of the device to the different macro access point further based at least in part on comparing the one or more performance parameters to a performance threshold value.

29. The non-transitory computer-readable medium of claim 28, wherein the one or more performance parameters further comprise an uplink loading or a noise rise related to the different macro access point.

30. The non-transitory computer-readable medium of claim 24, further comprising:
   code for causing the at least one computer to receive a measurement report from the device; and code for causing the at least one computer to select the different macro access point from the measurement report for the handover based at least in part on determining that the different macro access point operates using a different frequency or using a different radio access technology than the femto access point.

31. A femto access point for mitigating interference in a wireless network, comprising:
a memory;
at least one processor coupled to the memory and configured to:
receive at the femto access point from a device served by the femto access point, one or more parameters related to a decrease in a transmit power headroom at the device with respect to a transmission power cap, the transmission power cap is communicated from the femto access point to the device and used in uplink communications by the device, wherein the device is subject to interference from at least one other device served by at least one other access point;
receive, at the femto access point from the device served by the femto access point, a plurality of transmission power reports from the device that indicate the transmit power utilized by the device; and
determine the one or more parameters as a number of the plurality of transmission power reports received from the device over a period of time;
compare, at the femto access point, the one or more parameters to a threshold value to determine whether the device is potentially causing interference to communications of one or more macro access points; and
perform a handover of the device from the femto access point to a different macro access point based at least in part on the comparing.

32. The femto access point of claim 31, wherein the at least one processor is further configured to configure the device to transmit the plurality of transmission power reports based at least in part on reaching a threshold transmit power at the device.

33. The femto access point of claim 31, wherein the at least one processor is further configured to determine the one or more parameters as a frame error rate, a setpoint, or parameters of one or more power control commands related to the uplink communications.

34. The femto access point of claim 31, wherein the at least one processor is further configured to receive one or more other parameters as an uplink throughput, an uplink buffer size, a strength of a received pilot signal, or a pathloss received from the device, wherein the at least one processor is configured to perform the handover of the device further based at least in part on the one or more other parameters.

35. The femto access point of claim 31, wherein the at least one processor is further configured to receive one or more performance parameters from the different macro access point, and compare the one or more performance parameters to a performance threshold value to determine whether to perform the handover.

36. The femto access point of claim 35, wherein the one or more performance parameters further comprise an uplink loading or a noise rise related to the different macro access point.

37. The femto access point of claim 31, wherein the at least one processor is configured to select the different macro access point based at least in part on determining that the different macro access point operates using a different frequency or using a different radio access technology than the femto access point.

* * * * *